United States Patent
Gregory et al.

(10) Patent No.: US 9,624,655 B2
(45) Date of Patent: Apr. 18, 2017

(54) TOUCHLESS CONTROL OF ELECTRONIC WATER FAUCETS

(71) Applicant: Evalving Systems, LLC, Castle Rock, CO (US)

(72) Inventors: Stephen Owen Gregory, Denver, CO (US); James Louis Wolf, Castle Rock, CO (US)

( * ) Notice: Subject to any disclaimer, the term of this patent is extended or adjusted under 35 U.S.C. 154(b) by 0 days.

(21) Appl. No.: 15/073,429

(22) Filed: Mar. 17, 2016

(65) Prior Publication Data

US 2016/0273197 A1 Sep. 22, 2016

Related U.S. Application Data

(60) Provisional application No. 62/134,130, filed on Mar. 17, 2015.

(51) Int. Cl.
| | |
|---|---|
| *E03C 1/181* | (2006.01) |
| *E03C 1/05* | (2006.01) |
| *G05D 7/06* | (2006.01) |
| *G05D 23/13* | (2006.01) |

(52) U.S. Cl.
CPC ............ *E03C 1/057* (2013.01); *G05D 7/0635* (2013.01); *G05D 23/1393* (2013.01)

(58) Field of Classification Search
USPC ............................................................ 4/668
See application file for complete search history.

(56) References Cited

U.S. PATENT DOCUMENTS

| | | | | |
|---|---|---|---|---|
| RE37,888 E | * | 10/2002 | Cretu-Petra ............. | E03C 1/057 4/623 |
| 8,407,827 B1 | * | 4/2013 | Friedman ................ | E03C 1/057 4/623 |
| 2009/0056011 A1 | * | 3/2009 | Wolf ....................... | E03C 1/057 4/623 |

OTHER PUBLICATIONS

Cination, "iSense—Touch free Intelligent Faucets", internet publication, www.cination.com/cination/faq.php, entire document.

\* cited by examiner

*Primary Examiner* — Lauren Crane
(74) *Attorney, Agent, or Firm* — Duft Bornsen & Fettig, LLP

(57) ABSTRACT

Embodiments described herein provide touchless temperature and/or flow control for water faucets utilizing the movements of a user's hand toward or away from to a dispensing area of the faucet. One embodiment comprises a water faucet that provides touchless control of water dispensed by the water faucet. The water faucet comprises a controller and a spout head. The spout head includes a sensor electrically coupled to the controller that detects a movement of a user's hand toward or away from the spout head. The controller initiates dispensing of the water from the spout head at a pre-defined rate, and varies the flow rate based on the movement of the user's hand toward or away from the spout head.

24 Claims, 6 Drawing Sheets

TOUCHLESS CONTROL OF ELECTRONIC WATER FAUCETS

CROSS REFERENCE TO RELATED APPLICATIONS

This U.S. Patent Application claims priority to, and thus the benefit of an earlier filing date from, U.S. Provisional Patent Application No. 62/134,130 (filed Mar. 17, 2015) entitled "TOUCHLESS ELECTRONIC FAUCET", which is hereby incorporated by reference in its entirety.

FIELD

This disclosure relates to the field of water faucets and in particular, to touchless water faucets.

BACKGROUND

Hands-free water faucets may be used in public restrooms and in some commercial applications to prevent the spread of infectious disease by reducing the contact of a user's hands to the faucets. During typical operation, a user will place his/her hand below the dispensing area of the faucet, which senses the user's hand and initiates a flow of water from the dispensing area. However, this type of on/off dispensing is rather simplistic, which limits their flexibility in providing additional hands-free operational capabilities.

SUMMARY

Embodiments described herein provide touchless temperature and/or flow control for water faucets utilizing the relative position(s) of a user's hand proximate to a dispensing area of the faucet.

One embodiment comprises a water faucet that provides touchless control of water dispensed by the water faucet. The water faucet comprises a controller and a spout head. The spout head includes a sensor electrically coupled to the controller that detects a movement of a user's hand toward or away from the spout head. The controller initiates dispensing of the water from the spout head at a pre-defined rate, and varies the flow rate based on the movement of the user's hand toward or away from the spout head.

Another embodiment comprises a water faucet that provides touchless control of water dispensed by the water faucet. The water faucet comprises a controller and a spout head. The spout head includes a sensor electrically coupled to the controller that detects a movement of a user's hand toward or away from the spout head. The controller initiates dispensing of the water from the spout head at a pre-defined temperature, and varies the temperature based on the movement of the user's hand toward or away from the spout head.

Another embodiment comprises a method operable by a water faucet that provides touchless control of water dispensed by a spout head of the water faucet. The method comprises initiating a dispensing of the water from the spout head at a pre-defined flow rate, detecting a movement of a user's hand toward or away from the spout head, and varying the flow rate based on the movement of the user's hand toward or away from the spout head.

Another embodiment comprises a method operable by a water faucet that provides touchless control of water dispensed by a spout head of the water faucet. The method comprises initiating a dispensing of the water from the spout head at a pre-defined temperature, detecting a movement of a user's hand toward or away from the spout head, and varying the temperature based on the movement of the user's hand toward or away from the spout head.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
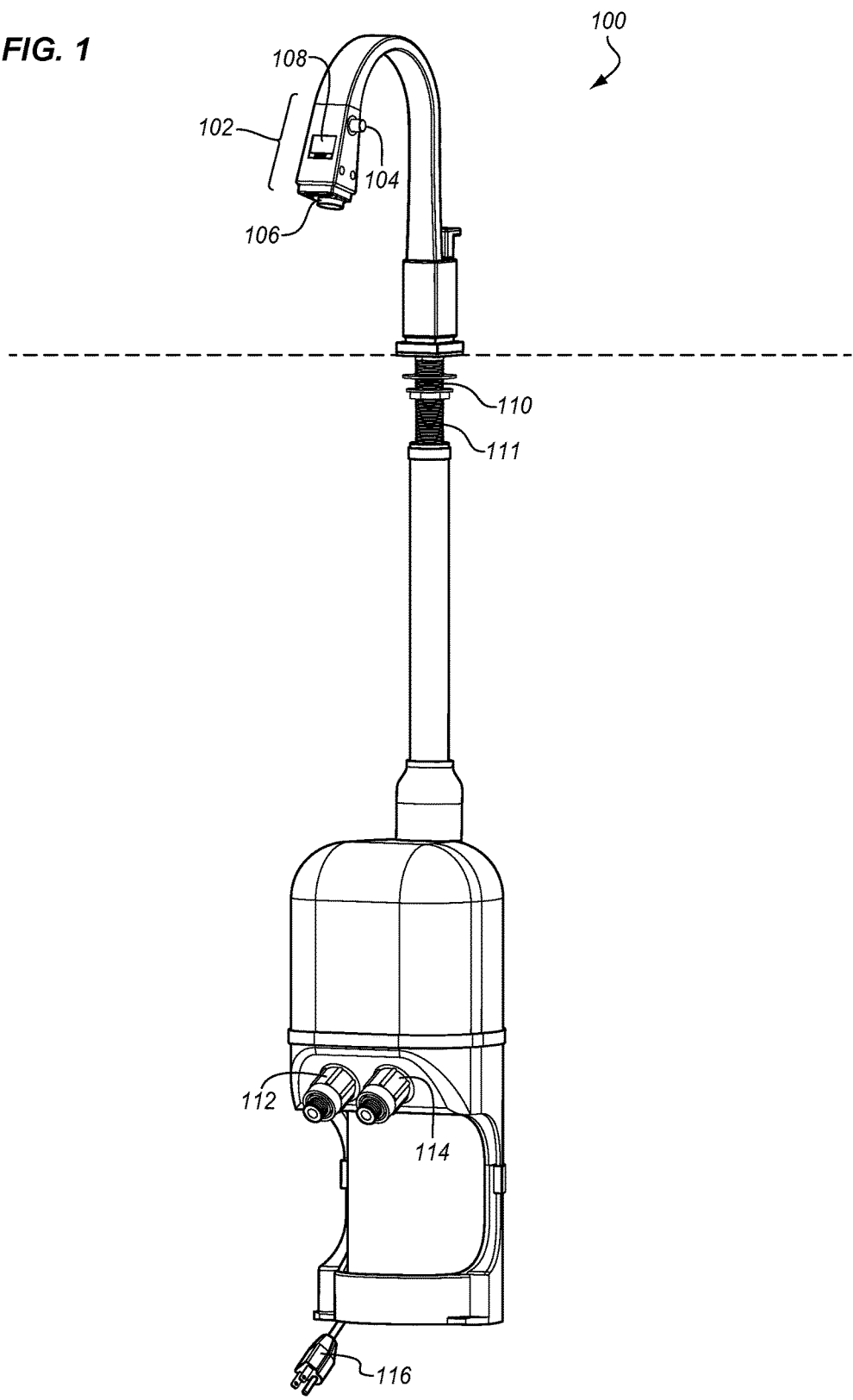
FIG. 1 illustrates a touchless water faucet in an exemplary embodiment.

FIG. 1 illustrates a touchless electronic water faucet 100 in an exemplary embodiment. Faucet 100 provides touchless water temperature and/or flow rate adjustments utilizing hand proximity changes relative to a spout head 102 of faucet 100. Spout head 102 includes various control electronics and sensors which allow a user to interface with faucet 100. Generally, spout head 102 provides the ability for a user to control the flow rate of water dispensed by spout head 102 (e.g., by a water dispenser 106), and/or to control the temperature of the water that is dispensed from spout head 102 by analyzing the position of a user's hand(s) relative to spout head 102.

In this embodiment, spout head 102 further includes a display 108, which may be utilized to present various elements of information to the user. For example, display 108 may present the temperature of the water dispensed by faucet 100, and/or the flow rate of the water dispensed by faucet 100. Display 108 may also present the temperature set by the user for the water dispensed by faucet 100 and/or the flow rate set by the user for the water dispensed by faucet 100. Display 108 may comprise any system, component, or device that is able to provide information to the user. Some examples of display 108 include Liquid Crystal Displays (LCDs), Light Emitting Diode (LED) displays, Organic LED (OLED) displays, etc.

FIG. 1 illustrates a dashed line, which delineates the portion of faucet 100 that will reside above a countertop installation, and the portion of faucet 100 that will reside below the countertop installation. A nut 110 wraps around a threaded portion 111 of faucet 100, and is used to secure faucet 100 in place through a hole in the countertop. Faucet 100, in this embodiment, also includes a cold water connection 112, a hot water connection 114, and an electrical connection 116 that provides AC power to faucet 100. A pop out drinking accessory 104 is also available at spout head 102 for the user.

Figure 2:
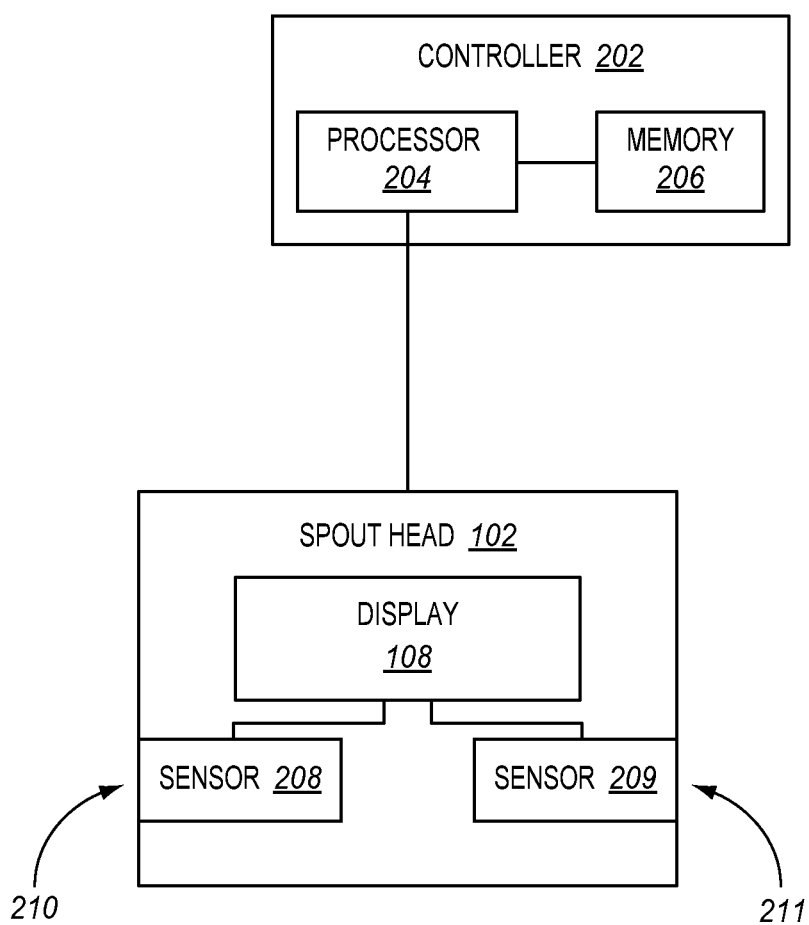
FIG. 2 is a block diagram of a control system for the touchless water faucet of FIG. 1 in an exemplary embodiment.

FIG. 2 is a block diagram of a controller 202 for faucet 100 in an exemplary embodiment. Controller 202 may reside within spout head 102 in some embodiments or within a portion of faucet 100 that is below the dashed line (e.g., below the countertop) in FIG. 1. Further, the functionality described herein for controller 202 may be segregated between different processing systems that may be present in both spout head 102 and in portions of faucet 100 that are below the countertop.

In this embodiment, spout head 102 includes sensors 208-209 that are disposed on different sides 210-211 of spout head 102. For instance, sensor 208 may be disposed on the left side of spout head 102, while sensor 209 may be disposed on the right side of spout head 102. This is just one possible configuration, and others exist. Generally, sensors 208-209 may be disposed on any two sides of spout head 102 that are different. Sensors 208-209 in this embodiment comprise any component, system, or device that are able to detect a position and/or movement of a user's hand relative to spout head 102. One example of sensors 208-209 may include a GP2D120 optoelectronic device by Sharp, which is capable of resolving distances in the range of 4 Centimeters (cm) to 30 cm.

In this embodiment, controller 202 includes any component, system, or device that is able to vary a flow rate and/or a temperature of water dispensed by spout head 102 based on a movement and/or a relative position of a user's hand proximate to sensors 208-209. While the specific hardware implementation of controller 202 is subject to design choices, one particular embodiment may include one or more processors 204 coupled with a memory 206. Processor 204 includes any electronic circuits and/or optical circuits that are able to perform functions. For example, processor 204 may perform any functionality described herein for controller 202. Processor 204 may include one or more Central Processing Units (CPU), microprocessors, Digital Signal Processors (DSPs), Application-specific Integrated Circuits (ASICs), Programmable Logic Devices (PLDs), control circuitry, etc. Some examples of processors include Intel® Core™ processors, Advanced Reduced Instruction Set Computing (RISC) Machines (ARM®) processors, etc.

Memory 206 includes any electronic circuits, and/or optical circuits and/or magnetic circuits that are able to store data. For instance, memory 206 may store information regarding the flow rate and/or temperature settings and/or current flow rate and/or temperature values, may store instructions for processor 204 to implement the functionality described herein for controller 202, etc. Memory 206 may include one or more volatile or non-volatile Dynamic Random Access Memory (DRAM) devices, FLASH devices, volatile or non-volatile Static RAM devices, magnetic disk drives, Solid State Disks (SSDs), etc. Some examples of non-volatile DRAM and SRAM include battery-backed DRAM and battery-backed SRAM.

Figure 3A:
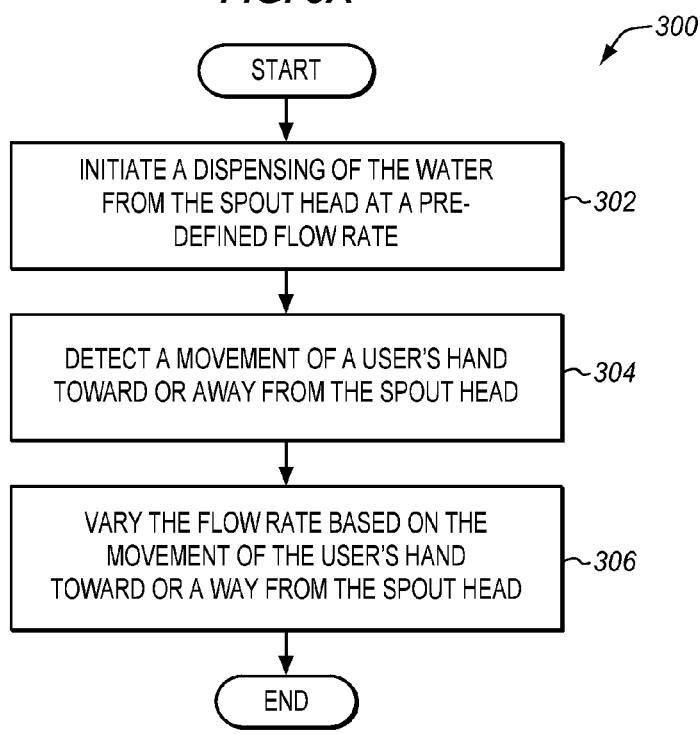
FIG. 3A illustrates a method of performing touchless flow rate control of a water faucet in an exemplary embodiment.
Figure 3B:
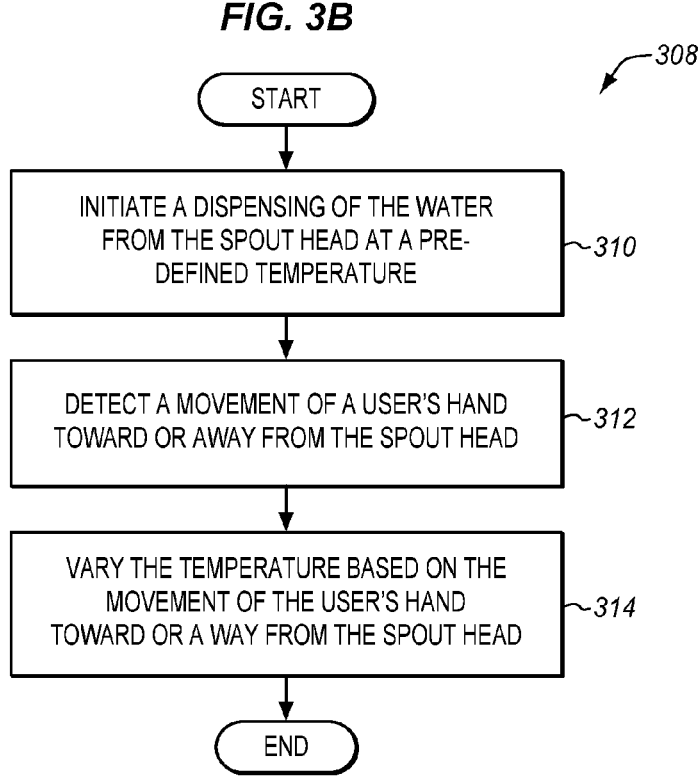
FIG. 3B illustrates a method of performing touchless temperature control of a water faucet in an exemplary embodiment.

Consider that faucet 100 is installed, powered electrically, and is coupled with a hot and cold water supply. FIG. 3A illustrates a method 300 of performing touchless flow rate control of a water faucet in an exemplary embodiment. FIG. 3B illustrates a method 308 of performing a touchless temperature control of a water faucet in an exemplary embodiment. Method 300 and method 308 will be discussed with respect to faucet 100 and controller 202 of FIGS. 1-2, although method 300 and method 308 may be performed by other water dispensing systems, not shown. The steps of the flow charts described herein may include other steps that are not shown. Also, the steps of the flow charts described herein may be performed in an alternate order.

Assume that a user approaches faucet 100 and initiates a flow of water from dispenser 106 (see FIG. 1). To do so, a user may place their hand(s) below spout head 102, which is detected by processor 204 utilizing a proximity sensor that faces downward into a sink basin (not shown). Processor 204 initiates a flow of water from dispenser 106 at a pre-defined flow rate (see step 302 of FIG. 3A). If the user desires to modify the flow rate of the water dispensed from spout head 102 utilizing non-contact hand movements, the user moves his/her hand toward or away from side 210 of spout head 102, which is detected by sensor 208 (see step 304 of FIG. 3A). Sensor 208 may utilize a pulsed LED to calculate a distance between the user's hand and side 210 of spout head 102, with a change of the distances over time defining rate of movement of the user's hand. Processor 204 determines the movement of the user's hand towards side 210 of spout head 102 utilizing sensor 208, and varies the flow rate of the water dispensed by spout head 102 (see step 306 of FIG. 3A). For example, if the user moves a hand closer to side 210 of spout head 102, this movement is detected by sensor 208 and identified by processor 204. Processor 204 may then increase the flow rate of the water dispensed by spout head 102 (e.g., by increasing the rate of water supplied to spout head 102). The rate of increase in the flow rate may depend on the rate at which the hand is moved towards side 210. In continuing with the example, if the user moves a hand away from side 210 of spout head 102, this movement is detected by sensor 208 and identified by processor 204. Processor 204 may then decrease the flow rate of the water dispensed by spout head 102 (e.g., by decreasing the flow rate of water supplied to spout head 102). The rate of decrease in the flow rate may depend on the rate at which the hand is moved away from side 210. Modifying the flow rate in this manner may occur in the reverse, with movement of the hand toward to side 210 of spout head 102 decreasing the flow rate, and movement of the hand away from side 210 of spout head 102 increasing the flow rate. Processor 204 may present the desired flow rate and/or the current flow rate to the user on display 108. Providing the user the ability to modify the flow rate of the water in a touchless manner reduces the user's contact with faucet 100, which prevents the spread of disease, especially in commercial installations.

In some embodiments, processor 204 may utilize sensor 208 to detect a velocity of the user's hand during movement of the hand toward or away from side 210 of spout head 102.

For instance, if the user moves his/her hand toward or away from side 210 of spout head 102 at a rate that exceeds a threshold, then processor 204 may set the flow rate to a minimum (e.g., by reducing the flow rate of water to spout head 102 to some non-zero value) or a maximum (e.g., by increasing the flow rate of water to spout head 102 to a maximum value).

In some embodiments, the user may also be able to adjust the temperature of the water dispensed by spout head 102 utilizing non-contact hand movements. Assume that a user approaches faucet 100 and initiates a flow of water from dispenser 106 (see FIG. 1). To do so, a user may place their hand(s) below spout head 102, which is detected by processor 204 utilizing a proximity sensor that faces downward into a sink basin (not shown). Processor 204 initiates a flow of water from dispenser 106 at a pre-defined temperature (see step 310 of FIG. 3B). If the user desires to modify the temperature, then the user moves his/her hand toward or away from side 211 of spout head 102, which is detected by sensor 209 (see step 312 of FIG. 3B). Sensor 209 may utilize a pulsed LED to calculate a distance between the user's hand and side 211 of spout head 102, with a change of the distances over time defining rate of movement of the user's hand. Processor 204 detects the movement of the user's hand toward or away from side 211 of spout head 102, and varies the temperature of the water dispensed by spout head 102 (see step 314 of FIG. 2B). For example, if the user moves a hand toward side 211 of spout head 102, this movement is detected by sensor 209 and identified by processor 204. Processor 204 may then increase the temperature of the water dispensed by spout head 102 (e.g., by increasing the amount of hot water supplied to spout head 102 as compared to the amount cold water supplied to spout head 102). In continuing with the example, if the user moves a hand away from side 211 of spout head 102, this movement is detected by sensor 209 and identified by processor 204. Processor 204 may then decrease the temperature of the water dispensed by spout head 102 (e.g., by decreasing the amount of hot water supplied to spout head 102 as compared to the amount of cold water supplied to spout head 102). Modifying the temperature of the water dispensed by spout head 102 in this manner may occur in the reverse, with movement of the hand closer to side 211 of spout head 102 decreasing the temperature, and movement of the hand farther from side 211 of spout head 102 increasing the temperature. Processor 204 may present the desired temperature and/or the current temperature to the user on display 108. Providing the user the ability to modify the temperature of the water in a touchless manner reduces the user's contact with faucet 100, which prevents the spread of disease, especially in commercial installations.

In some embodiments, processor 204 may utilize sensor 209 to detect a velocity of the user's hand during movement of the hand toward or away from side 211 of spout head 102. For instance, if the user moves his/her hand toward or away from side 211 of spout head 102 at a rate that exceeds a threshold, then processor 204 may set the temperature to a minimum (e.g., by shutting off the supply of hot water to spout head 102) or a maximum (e.g., by shutting off the supply of cold water to spout head 102). However, the maximum allowable temperature may be limited to prevent scalding.

In some embodiments, it may be desirable to distribute control functions for faucet 100 between spout 102 and portions of faucet 100 that are mounted underneath the countertop (e.g., below the dashed line in FIG. 1). This embodiment will be discussed next.

Figure 4:
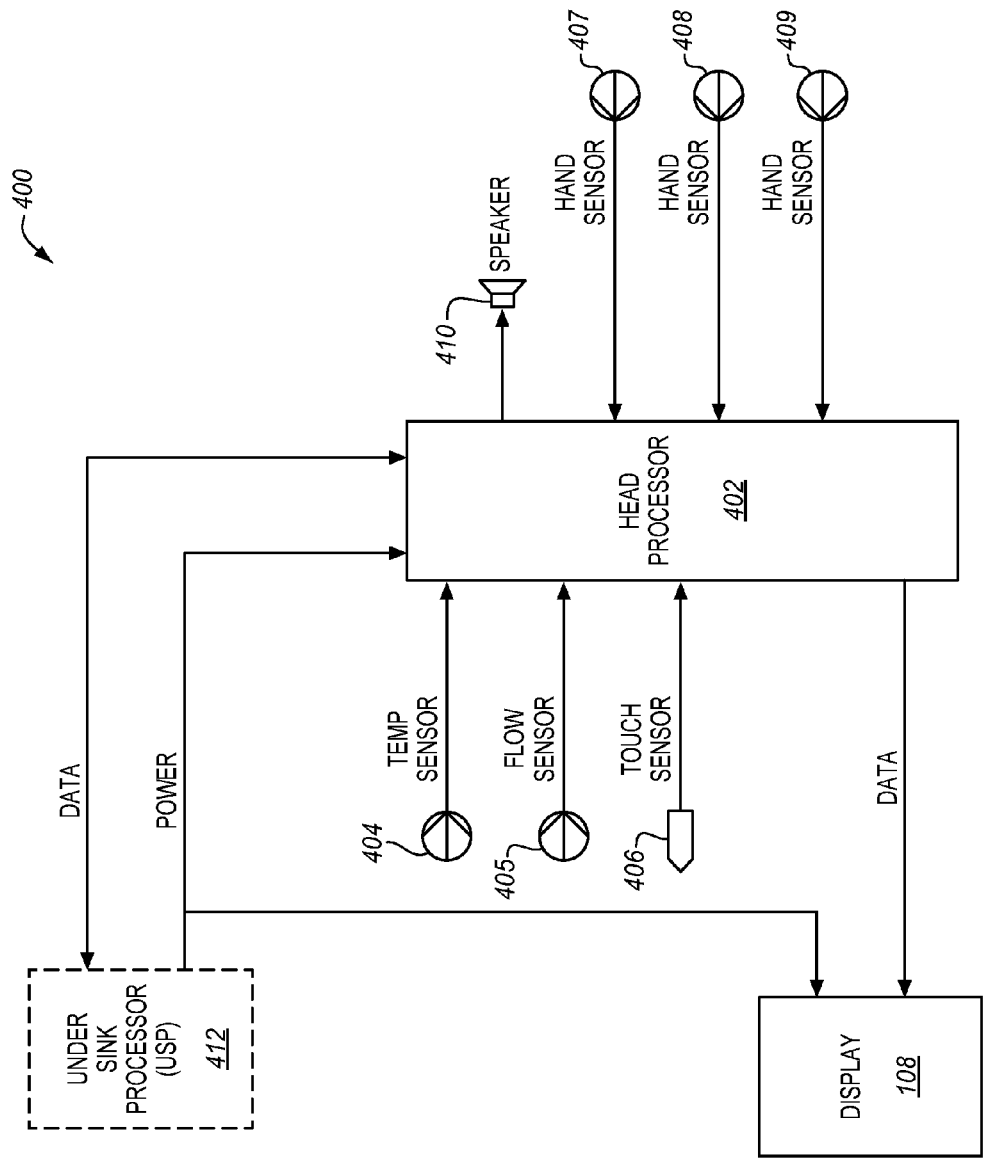
FIG. 4 is a block diagram of another control system located within a spout of the faucet of FIG. 1 in an exemplary embodiment.

FIG. 4 is a block diagram of another control system 400 located within spout 102 in an exemplary embodiment. In this embodiment, system 400 includes a head processor 402 that is coupled to various sensors 404-409, a speaker 410, and display 108. Head processor 402 comprises any component or device that performs various control functions with respect to faucet 100. A sensor 404 in this embodiment is used to measure a temperature of the water output by spout head 102, and a sensor 405 measures a flow rate of the water. Sensor 406 is a touch-sensor, and is used to manually dispense water from spout head 102 and to enter a setup mode.

Sensors 407-409 are disposed at various locations around spout head 102 and are used to control a temperature of water flow from spout head 102, a flow rate of the water from spout head 102, and for activating the flow of water.

In this embodiment, sensor 407 is monitored by head processor 402 to control a temperature of the water dispensed by spout head 102 using a movement of the user's hand relative to spout head 102. For example, if sensor 407 is located on the right side of spout head 102 in FIG. 1, then a user may be able to increase a temperature of the water dispensed from spout head 102 by moving a hand closer to the right side of spout head 102, and to decrease a temperature of the water dispensed from spout head 102 by moving the hand farther away from the right side of spout head 102. This functionality may also be reversed, with the temperature decreasing as the hand is moved towards spout head 102, and the temperature increasing as the hand is moved away from spout head 102. Further, although sensor 407 has been described with respect to the right side of spout head 102, sensor 407 may be located anywhere on spout head 102 as a matter of design choice. For example, sensor 407 may be located on the left side of spout head 102, on the back side of spout head 102, etc.

In this embodiment, sensor 408 is monitored by head processor 402 to control a flow rate of the water dispensed by spout head 102 using a movement of the user's hand relative to spout head 102. For example, if sensor 408 is located on the left side of spout head 102 in FIG. 1, then a user may be able to increase a flow rate of the water dispensed from spout head 102 by moving a hand towards the left side of spout head 102, and to decrease a flow rate of the water dispensed from spout head 102 by moving the hand away from the left side of spout head 102. This functionality may also be reversed, with the flow rate decreasing as the hand is moved towards spout head 102, and the flow rate increasing as the hand is moved towards spout head 102. Further, although sensor 408 has been described with respect to the left side of spout head 102, sensor 408 may be located anywhere on spout head 102 as a matter of design choice. For example, sensor 408 may be located on the right side of spout head 102, on the back side of spout head 102, etc.

In this embodiment, sensor 409 is monitored by head processor 402 to initiate a flow rate of the water dispensed by spout head 102 when a user positions a hand below spout head 102. For example, if sensor 409 is located on the bottom of spout head 102 facing the bottom of a sink, then water may be dispensed when the user positions their hand(s) below the spout head 102 and in the sink. Sensor 409 is also used during setup for automatic operation. In some embodiments, sensors 407-409 are pulsed Infra-Red (IR) proximity sensors, and may be the same or similar to sensors 208-209 (see FIG. 2) previously described.

In this embodiment, system 400 utilizes speaker 410 to provide audible alerts and speech output. For instance, an audible alert may indicate that a previously set temperature has been reached, while a speech output may be used to instruct the user in the operation of faucet 100 (e.g., "move hand toward or away from the right side of the spout head to increase or decrease the temperature of the water"). In some cases, the audible alerts and/or the speech output may be used to indicate error conditions that may have occurred.

In this embodiment, power to system 400 is supplied by water control electronics mounted under a sink through wires. Head processor 402 communicates with an under sink processor 412 via a digital protocol such as the I2C protocol. Under sink processor 412 is tasked with operating a water control assembly, communicating with head processor 402, and maintaining safety for the user.

Figure 5:
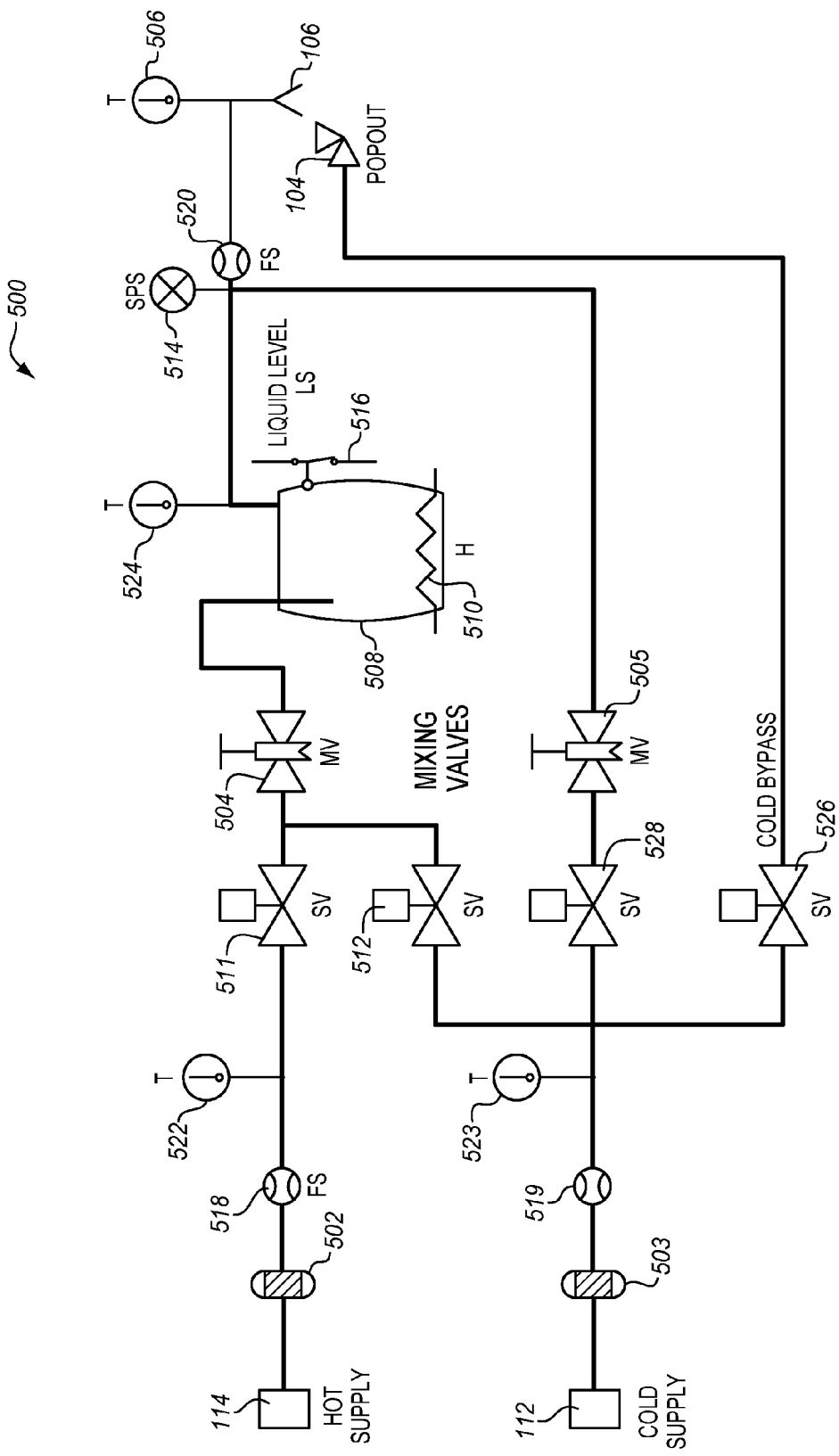
FIG. 5 is a block diagram of a water control assembly for the faucet of FIG. 1 in an exemplary embodiment.

FIG. 5 is a block diagram of a water control assembly 500 for faucet 100 in an exemplary embodiment. In this embodiment, assembly 500 includes two pressure reducers 502-503 that reduce water pressure from their respective supplies. System 500 further includes two mixing valves 504-505 that perform mixing of hot and cold water from their respective inlets. Mixing valves 504-505 are operated by motors under control of the under sink processor 412, and a temperature sensor 506 is used to control the temperature of water dispensed by spout 102. An instant hot water tank 508 provides hot water utilizing an internal heater 510 at a temperature of about 180 degrees Fahrenheit (F) to reduce the transit time for delivering hot water to spout head 102. The size of hot water tank 508 is selected to allow normal hand washing activities without the need for hot water from hot supply connection 114, which saves water and energy. For short hot water delivery durations, a supply valve 511 is used to deliver cold water into hot water tank 508. For longer hot water delivery durations, a supply valve 512 is used to deliver hot water to hot water tank 508. If temperature sensor 522 indicates that hot supply 114 is below a threshold temperature, then supply valve 512 may be used to fill hot water tank 508 from cold supply 112 rather than supply valve 511. This saves filling the hot water lines from a hot water tank all the way to faucet 100 for typically short durations of use, like rinsing your hands. This should save considerable amounts of hot water usage for the consumer.

An exit from hot water tank 508 is not restricted to reduce the possibility of boiling and gas pressure buildup. A safety pressure sensor 514 shuts down the system should a user block the water output from spout head 102. A level sensor 516 ensures that hot water tank 508 is kept at a desired fill level.

To allow for flow and temperature control algorithms to be performed by under sink processor 412, three flow sensors 518-520 and four temperature sensors 506 and 522-524 are utilized. Flow sensor 518 is used to determine the hot supply flow rate, flow sensor 519 is used to determine the cold supply flow rate, and flow sensor 520 is used to determine the overall flow rate from spout head 102. Temperature sensor 522 is used to determine the hot supply temperature, temperature sensor 523 is used to determine the cold supply temperature, temperature sensor 524 is used to determine the temperature at the outlet of hot water tank 508, and temperature sensor 506 is used to determine the temperature at the outlet of spout head 102. Under sink processor 412 adjusts the combination of two mixing valves 504-505 to obtain the overall flow rate and temperature that is desired at spout head 102 by the user. A supply valve 526 is used to supply cold water to pop out drinking accessory 104, while a supply valve 528 is used to supply cold water to spout head 102.

Figure 6:
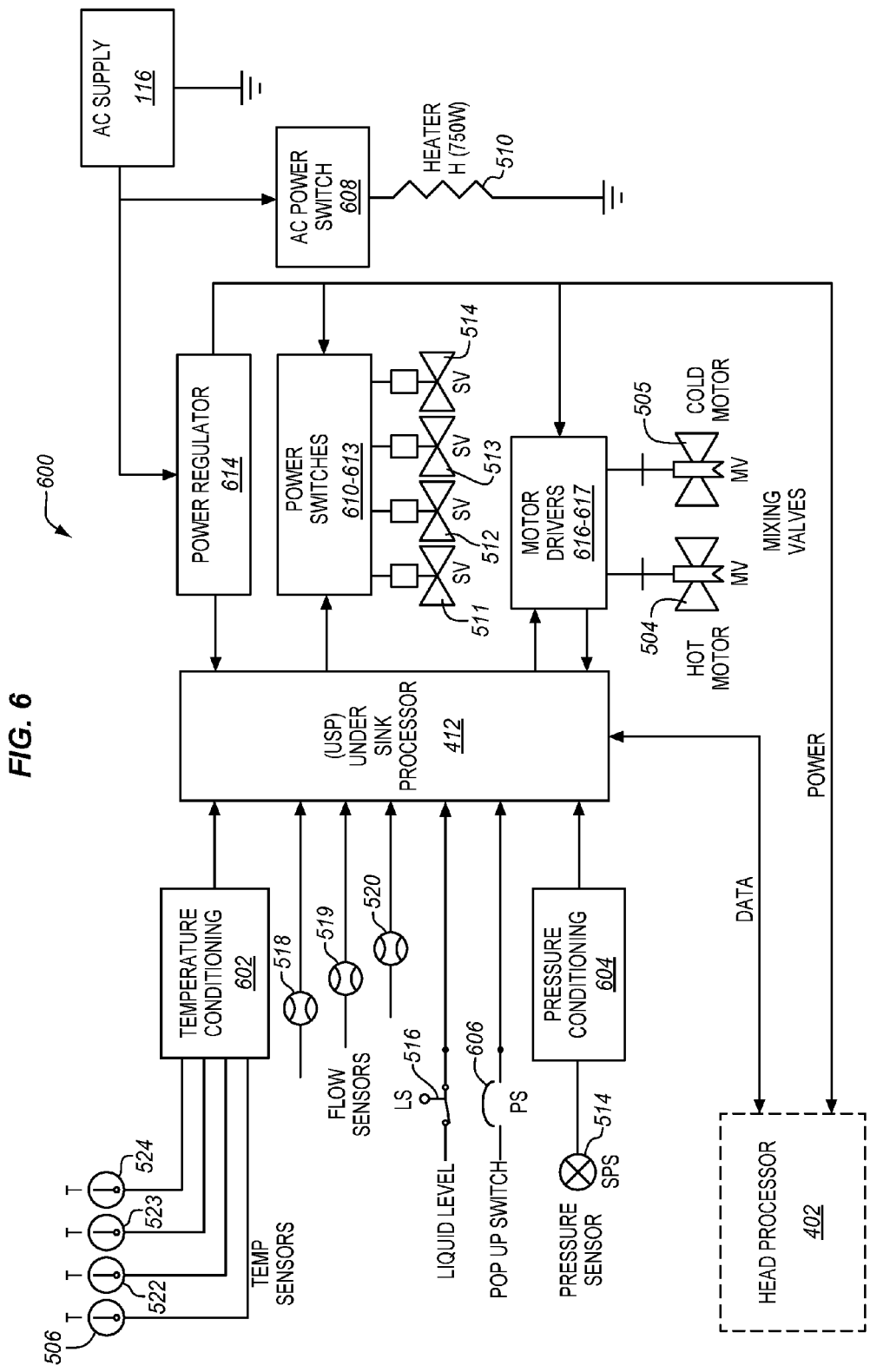
FIG. 6 is a block diagram of another control system located in an under sink portion of the faucet of FIG. 1 in an exemplary embodiment.

FIG. 6 is a block diagram of another control system 600 located in an under sink portion of faucet 100 in an exemplary embodiment. System 600 in this embodiment includes under sink processor 412 briefly described with respect to FIG. 4, and a power regulator 614 which is supplied AC power by an AC supply 116. System 600 in this embodiment further includes an AC power switch 608 which is used to control heater 510 in hot water tank 508, and power switches 610-613, which are used to control supply valves 511-514. System 600 in this embodiment further includes motor drivers 616-617, which are used to control mixing valves 504-505.

Temperature conditioning circuits 602 and pressure conditioning circuits 604 illustrated in FIG. 6 may be used to band-limit analog input signals prior to sampling the signals. A pop up switch 606 is used by under sink processor 412 to signal that the user wishes to access pop out water dispenser 104.

In this embodiment, faucet 100 is controlled by software embedded in read only memory that is located in both head processor 402 and under sink processor 412. The software implements the detection of hand proximity events; switch presses and likewise controls display 108, and water control functions. In operation primary control is assigned to under sink processor 412 to make the final control decisions. Under sink processor 412 polls head processor 402 to detect events, and utilizes display 108 to show the dispensed water temperature and/or the dispensed water flow rate. Under sink processor 412 also polls head processor 402 regarding which words or tones to generate when audio output is desired.

Under sink processor 412 is also responsible for the safe operation of faucet 100, monitors dispensed water temperature utilizing sensor 506, and controls motor drivers 616-617 to maintain a constant desired temperature through a control loop. If the temperature becomes unsafe (e.g., the user may be scalded by hot water), under sink processor 412 disables the flow of water unless safety has been purposely overridden by the user.

In some embodiments, the user may operate faucet 100 in different modes of operation, including in-home setup mode, normal operating mode, or safety mode.

In some embodiments, spout head 102 may include a manually operated button located on a front portion, which allows the user to activate on and off operation of the water flow from faucet 100. The manually operated button allows for continuous water flow into the sink basin until the water reaches a predetermined level below the sink perimeters or sink dam, at which time faucet 100 may disable the continuous flow. The manually operated button will, when touched for a predetermined duration, enable in-home setup mode allowing an initial installation to be customized to its mounting and sink format.

In some embodiments, a sensor is located in spout head 102 facing downward toward the sink basin. The downward looking sensor identifies a distance between a spout aerator to the bottommost plane of the lowest sink well it is positioned over. This sensor may also be used to determine a level of water in the basin for terminating the flow of water. For example, the sensor may be used to determine when to shut off the flow of water whenever the water level in the basin exceeds a pre-determined limit. This may be used to prevent the inadvertent overflow of water from the basin.

In some embodiments, when functioning in in-home setup mode, the downward looking sensor identifies the distances from the sensor to the topmost plane of the bottom of the sink in the sensors field of view to the control interface. The downward looking sensor is utilized to disable on and off operation should an objected be presented closer than a predetermined distance from the spout aerator. A mapping relationship is utilized to determine if an additional object has entered the field of view of the downward facing sensor to enable the automatic water dispensing operation.

In some embodiments, display 108 may flash when the actual water temperature arrives at the set temperature. While in normal operation with scalding sensing enabled, display 108 will flash when the dispensed water temperature exceeds 117 F and a safety mode will be entered. While in this mode a delay will be imposed to the automatic-on, but not manual-on operation of faucet 100 for a predetermined duration regardless of the source of a touch-less control input. The safety mode will enable at least one audio signal to warn the user of water temperatures exceeding 117 F. is about to be dispensed when the touchless controls sense either a hand or an object within the predetermined distance of the downward looking sensor. Safety mode may be disabled and normal operation mode initiated after the water temperature falls below 117 F. In some embodiments, faucet 100 is programmed to prevent water from being dispensed at a temperature that exceeds 117 F.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media. Embodiments disclosed herein can take the form of software, hardware, firmware, or various combinations thereof.

Although specific embodiments were described herein, the scope is not limited to those specific embodiments. Rather, the scope is defined by the following claims and any equivalents thereof.

The invention claimed is:

1. A water faucet configured to provide touchless control of water dispensed by the water faucet, the water faucet comprising: a controller; and a spout head, including: a sensor electrically coupled to the controller that is configured to detect a movement of a user's hand toward or away from the spout head; the controller configured to initiate dispensing of the water from the spout head at a pre-defined flow rate, and to vary the flow rate based on the movement of the user's hand toward or away from the spout head; The controller is configured to determine a velocity of the user's hand toward or away from the spout head utilizing the sensor, and to vary the flow rate based on the velocity.

2. The water faucet of claim 1 wherein:
the controller is configured to determine that the velocity of the user's hand toward the spout head exceeds a threshold, and to set the flow rate to one of a maximum and a non-zero minimum based on the determination.

3. The water faucet of claim 2 wherein:
the controller is configured to set the flow rate to the maximum based on the determination.

4. The water faucet of claim 1 wherein:
the controller is configured to determine that the velocity of the user's hand away from the spout head exceeds a threshold, and to set the flow rate to one of a non-zero minimum and a maximum based on the determination.

5. The water faucet of claim 4 wherein:
the controller is configured to set the flow rate to the non-zero minimum based on the determination.

6. The water faucet of claim 1 wherein:
the spout head further includes another sensor electrically coupled to the controller that is configured to detect a level of water in a sink basin below the spout head; and
the controller is configured to monitor the level of water in the sink basin utilizing the other sensor, to determine that the level of water in the sink basin is higher than a threshold, and to terminate the dispensing of the water from the spout head in response to the determination.

7. A water faucet configured to provide touchless control of water dispensed by the water faucet, the water faucet comprising: a controller; and a spout head, including: a sensor electrically coupled to the controller that is configured to detect a movement of a user's hand toward or away from the spout head; the controller configured to initiate dispensing of the water from the spout head at a pre-defined temperature, and to vary the temperature based on the movement of the user's hand toward or away from the spout head; The controller is configured to determine a velocity of the user's hand toward or away from the spout head utilizing the sensor, and to vary the temperature based on the velocity.

8. The water faucet of claim 7 wherein:
the controller is configured to determine that the velocity of the user's hand toward the spout head exceeds a threshold, and to set the temperature to one of a maximum and a minimum based on the determination.

9. The water faucet of claim 8 wherein:
the controller is configured to set the temperature to the maximum based on the determination.

10. The water faucet of claim 7 wherein:
the controller is configured to determine that the velocity of the user's hand away from the spout head exceeds a threshold, and to set the temperature to one of a minimum and a maximum based on the determination.

11. The water faucet of claim 10 wherein:
the controller is configured to set the temperature to the minimum based on the determination.

12. The water faucet of claim 7 wherein:
the spout head further includes another sensor electrically coupled to the controller that is configured to detect a level of water in a sink basin below the spout head; and
the controller is configured to monitor the level of water in the sink basin utilizing the other sensor, to determine that the level of water in the sink basin is higher than a threshold, and to terminate the dispensing of the water from the spout head in response to the determination.

13. A method operable by a water faucet that is configured to provide touchless control of water dispensed by a spout head of the water faucet, the method comprising: initiating a dispensing of the water from the spout head at a pre-defined flow rate; detecting a movement of a user's hand toward or away from the spout head; and varying the flow rate based on the movement of the user's hand toward or away from the spout head; Detecting the movement of the user's hand further comprises: determining a velocity of the user's hand toward or away from the spout head; and varying the flow rate further comprises: varying the flow rate based on the velocity.

14. The method of claim 13 wherein:
determining the velocity further comprises:
determining that the velocity of the user's hand toward the spout head exceeds a threshold; and
varying the flow rate based on the velocity further comprises:
setting the flow rate to one of a maximum and a non-zero minimum based on the determination.

15. The method of claim 14 wherein setting flow rate based on the velocity further comprises:
setting the flow rate to the maximum based on the determination.

16. The method of claim 13 wherein:
determining the velocity further comprises:
determining that the velocity of the user's hand away from the spout head exceeds a threshold;
varying the flow rate based on the velocity further comprises:
setting the flow rate to one of a non-zero minimum and a maximum based on the determination.

17. The method of claim 16 wherein setting the flow rate further comprises:
setting the flow rate to the non-zero minimum based on the determination.

18. The method of claim 13 further comprising:
monitoring a level of water in a sink basin below the spout head;
determining that the level of water in the sink basin is higher than a threshold; and
terminating the dispensing of the water from the spout head in response to the determination.

19. A method operable by a water faucet that is configured to provide touchless control of water dispensed by a spout head of the water faucet, the method comprising: initiating a dispensing of the water from the spout head at a pre-defined temperature; detecting a movement of a user's hand toward or away from the spout head; and varying the temperature based on the movement of the user's hand toward or away from the spout head; detecting the movement further comprises: determining a velocity of the user's hand toward or away from the spout; and varying the temperature further comprises: varying the temperature based on the velocity.

20. The method of claim 19 wherein:
determining the velocity further comprises:
determining that the velocity of the user's hand toward the spout head exceeds a threshold; and
varying the temperature based on the velocity further comprises:
setting the temperature to one of a maximum and a minimum based on the determination.

21. The method of claim 20 wherein setting the temperature further comprises:
setting the temperature to the maximum based on the determination.

22. The method of claim 19 wherein:
determining the velocity further comprises:
determining that the velocity of the user's hand away from the spout head exceeds a threshold;
varying the temperature based on the velocity further comprises:
setting the temperature to one of a minimum and a maximum based on the determination.

23. The method of claim 22 wherein setting the temperature further comprises:
setting the temperature to the minimum based on the determination.

24. The method of claim 19 further comprising:
monitoring a level of water in a sink basin below the spout head;
determining that the level of water in the sink basin is higher than a threshold; and
terminating the dispensing of the water from the spout head in response to the determination.

* * * * *